United States Patent
Umeshima

[19]

[11] Patent Number: 5,909,222
[45] Date of Patent: *Jun. 1, 1999

[54] DATA TRANSFORMATION DEVICE

[75] Inventor: Toshiaki Umeshima, Tokyo, Japan

[73] Assignee: NEC Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/536,341

[22] Filed: Sep. 29, 1995

[30] Foreign Application Priority Data

Sep. 29, 1994 [JP] Japan ................................. 6-259177

[51] Int. Cl.$^6$ ................................................ G06F 15/00
[52] U.S. Cl. ........................................................ 345/437
[58] Field of Search ............................. 395/137, 133; 345/433, 437, 520, 521, 121, 126

[56] References Cited

U.S. PATENT DOCUMENTS

| | | | |
|---|---|---|---|
| 4,168,488 | 9/1979 | Evans ........................................ | 345/437 |
| 4,554,638 | 11/1985 | Iida .......................................... | 364/521 |
| 4,929,085 | 5/1990 | Kajihara ................................... | 345/437 |
| 4,947,344 | 8/1990 | Hayashi et al. .......................... | 364/518 |
| 5,081,700 | 1/1992 | Crozier ..................................... | 395/150 |
| 5,365,601 | 11/1994 | Kadakia et al. .......................... | 382/46 |
| 5,479,525 | 12/1995 | Nakamura et al. ....................... | 382/297 |

*Primary Examiner*—Phu K. Nguyen
*Attorney, Agent, or Firm*—Ostrolenk, Faber, Gerb & Soffen, LLP

[57] ABSTRACT

A data transformation device includes a RAM cell array composed of RAM cells of $n^2$, a data writer to collectively write the image data of "n" bits into selected RAM cells of the RAM cell array, and a data reader to collectively read image data of "n" bits from selected RAM cells of the RAM cell array. The data transformation device also includes a RAM cell matrix of a set of a plurality of RAM cell arrays composed of RAM cells of $n^2$, a RAM cell selector to select a RAM cell array of the RAM matrix, a data writer to collectively write the image data of "n" bits into RAM cells of the selected RAM cell array, and a data reader to collectively read image data of "n" bits from RAM cells of the selected RAM cell array.

20 Claims, 6 Drawing Sheets

DATA TRANSFORMATION DEVICE

BACKGROUND OF THE INVENTION

1. Field of the Invention

This invention relates to a data transformation device, and more specifically, to a data transformation device especially used for a rotation processing of image data.

2. Description of Related Art

An example of the prior art image data rotation processing is shown in FIGS. 1 to 3. FIG. 1 shows the prior art data transformation device used for the rotation process of image data of "n" bits×"n" bits (where "n" is integer not less than 2). FIG. 2 shows a detail circuit of a RAM (Random Access Memory) cell marked with circles in FIG. 1, and FIG. 3 shows a detail circuit of a RAM cell not marked with circles in FIG. 1.

In the data transformation device of the prior art, the data is written in the following way: For example, the address line 401-n becomes "H" (high logical level) by an address selecting decoder 403, and the address line 401 of RAM cells 400-n0 to 400-nn becomes "H". In this case, the data of 402-li to 402-ni are written in RAM cells 400-n0 to 400-nn by the data line 405 and 406. On that time, the address line of RAM cells 400-n0 to 400-nn becomes "H", because the address line 401 and the address line 402 of the RAM cells 400-n0 are connected each other. But, the data of RAM cells 400-00 to 400-n0 are not destroyed because the data line 403 and 404 are precharged by a precharge signal 410.

Similarly to the case of data writing, the data is read by the following way that, as an example, the address line 401-n becomes "H" by the address selecting decoder 403, and one of the selected address line 401 of RAM cells 400-n0 to 400-nn of RAM cells becomes "H" and the address line 402 of RAM cells 400-00 to 400-n0 becomes "H". On that time, the data of RAM 400-n0 to 400-nn are read into the data line 405 and 406.

And in a time of the rotation signal 411 of "H", data of the data line 403 and 404 are issued to 402-lo to 402-n0, and in a time of the rotation signal 411 of "L" (low logical level), data of the data line 405 and 406 are issued to 402-lo to 402-n0.

Further, the other image data processing system for rotating image data is also shown Japanese Patent Application Laid-open No. JP-A-4-33178. It is the way that the CPU divides image information into K pixels=L columns of image information groups to rotate by an arbitrary degree by rectangular unit the pixel information on a work memory by each pixel unit by an arbitrary degree by rectangular unit. And then, It issues successively pixel of the pixel information group by the group unit into L image information latch circuits of K bits allocated in I/O address space of CPU. And, the same bits of outputs of the L circuits of the K bits of image information latch circuit are connected to the input and successively read from the K rotation gate circuits of L bits allocated in I/O address space CPU. And thereafter, It writes the image information which is divided the image information group by the group unit into the block rotated of an arbitrary angle by a rectangular unit.

The above mentioned data transformation device of prior art uses special RAM cells composed of 8 transistors, and it needs 2 systems of address line and data line. So, it causes a problem that the circuit scale becomes great. And also, there is the other problem that the wire length is long and its critical delay becomes great.

On the other hand, the other image data processing system for rotating image data is shown in Japanese Patent Application Laid-open No. JP-A-4-33178. but it needs circuits for the rotation of image data having image information latch circuits and rotation gate circuits. So it also causes a problem that its circuit scale becomes great.

SUMMARY OF THE INVENTION

An object of the present invention is to provide a data transformation device which comprises RAM cells array composed of usual RAM cells without using the two systems of the address line and the data line.

Another object of the present invention is to provide a data transformation device having a small circuit scale and also a small critical delay.

The above and other object of the present invention are achieved in accordance with the present invention by a data transformation device for transforming a square image data WDij ($i=1$ to n (row direction), $j=1$ to n (column direction)) of an n-bit width and an n-bit height to a +90° rotated image data RDlm ($l=1$ to n (row direction), $m=1$ to n (column direction)) comprising:

a RAM cell array composed of RAM cells of $n^2$, data writing means to collectively write an n-bit image data WDij ($i=1$ to n) into RAM cells at an address $\{(i-1)n+j\}$ ($i=1$ to n) in the RAM cell array, and data reading means to read collectively an n-bit image data RDlm ($l=1$ to n) from RAM cells at an address $\{n(n-m)+1\}$ ($l=1$ to n) in the RAM cell array.

According to another aspect of the present invention, there is provided a data transformation device for transforming a square image data WDij ($i=1$ to n (row direction), $j=1$ to n (column direction)) of an n-bit width and an n-bit height to a −90° rotated image data RDlm ($l=1$ to n (row direction), $m=1$ to n (column direction)) comprising:

a RAM cell array composed of RAM cells of $n^2$, data writing means to collectively write an n-bit image data WDij ($i=1$ to n) into RAM cells at an address $\{in-j+1\}$ ($i=1$ to n) of the RAM cell array, data reading means to read collectively an n-bit image data RDlm ($l=1$ to n) from RAM cells at an address $\{n(m-1)+1\}$ ($l=1$ to n) of the RAM cell array.

According to still another aspect of the present invention, there is provided a data transformation device for transforming "q" items of ($q \geq 2$, integer) square image data WDijp ($i=1$ to n (row direction), $j=1$ to n (column direction), $p=1$ to q (number)) of an n-bit width and an n-bit height to "q" items of +90° rotated image data RDlmp ($l=1$ to n (row direction), $m=1$ to n (column direction), $p=1$ to q (number)), comprising:

a RAM cell matrix constituted of a set of "q" RAM cell arrays composed of RAM cells of $n^2$, RAM cell selecting means to select a (p)th RAM cell array from the RAM cell matrix, data writing means to collectively write an n-bit image data WDijp ($i=1$ to n) into RAM cells at an address $\{(i-1)n+j\}$ ($i=1$ to n) of the (p)th RAM cell array selected by the RAM cell array selecting means, and data reading means to collectively read an n-bit image data RDlmp ($l=1$ to n) from RAM cells at an address $\{n(n-m)+1\}$ ($l=1$ to n) of the (p)th RAM cell array selected by the RAM cell array selecting means.

According to a still further aspect of the present invention, there is provided a data transformation device for transforming "q" items of ($q \geq 2$, integer) square image data WDijp (i=1 to n (row direction), j=1 to n (column direction), p=1 to q (number)) of an n-bit width and an n-bit height to "q" items of −90° rotated image data RDlmp (l=1 to n (row direction), m=1 to n (column direction), p=1 to q (number)), comprising:

a RAM cell matrix constituted of a set of "q" RAM cell arrays composed of RAM cells of $n^2$, RAM cell selecting means to select a (p)th RAM cell array from the RAM cell matrix, data writing means to collectively write an n-bit image data WDijp (i=1 to n) into RAM cells at an address {in−j+1}(i=1 to n) of the (p)th RAM cell array selected by the RAM cell array selecting means, and data reading means to collectively read an n-bit image data RDlmp (l=1 to n) from RAM cells at an address {n(m−1)+1}(l=1 to n) of the (p)th RAM cell array selected by the RAM cell array selecting means.

The above and other objects, features and advantages of the present invention will be apparent from the following description of preferred embodiments of the invention with reference to the accompanying drawings.

DESCRIPTION OF THE PREFERRED EMBODIMENTS

Figure 1:
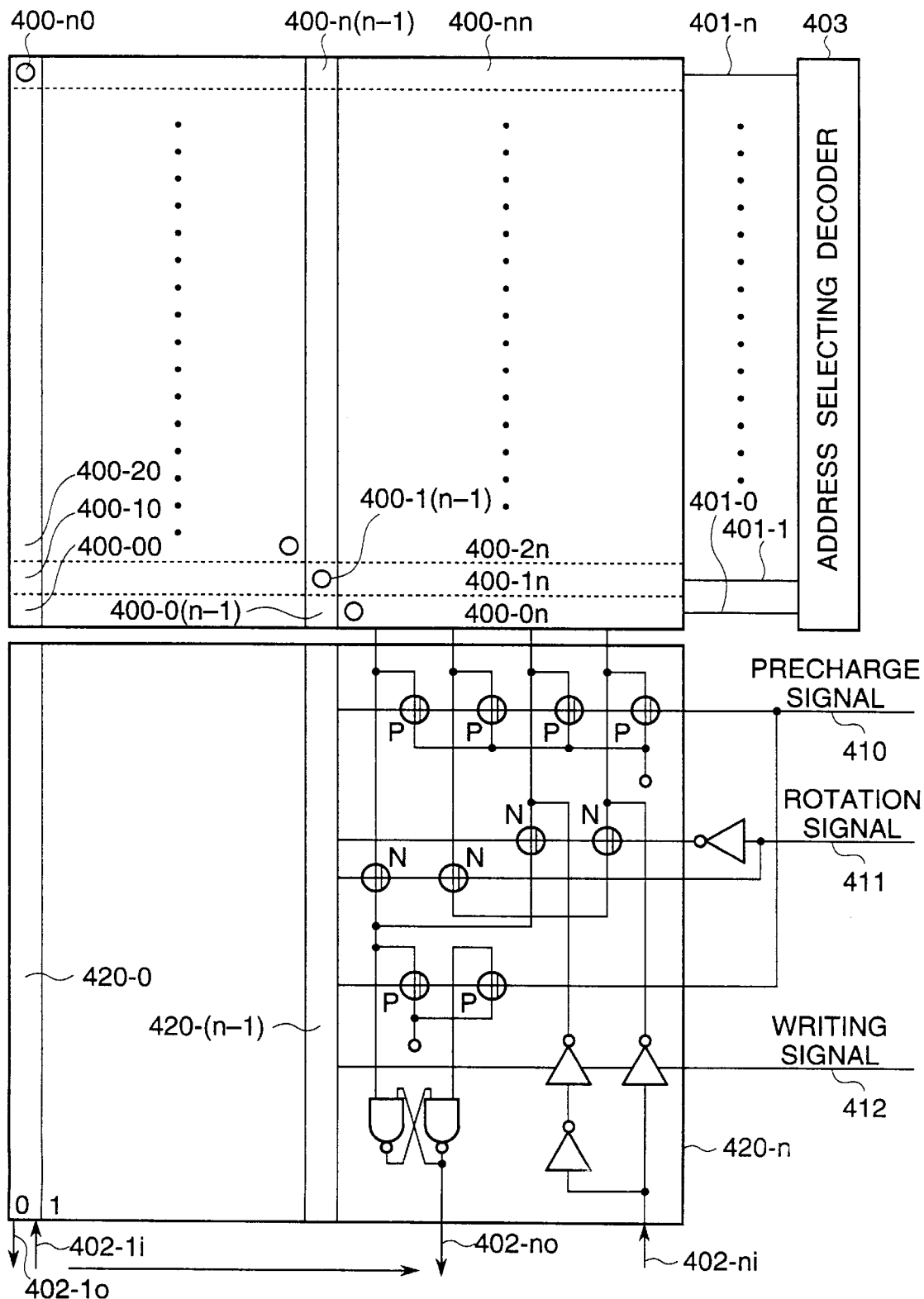
FIG. 1 is a block diagram of an example of the data transformation device of the prior art.
Figure 2:
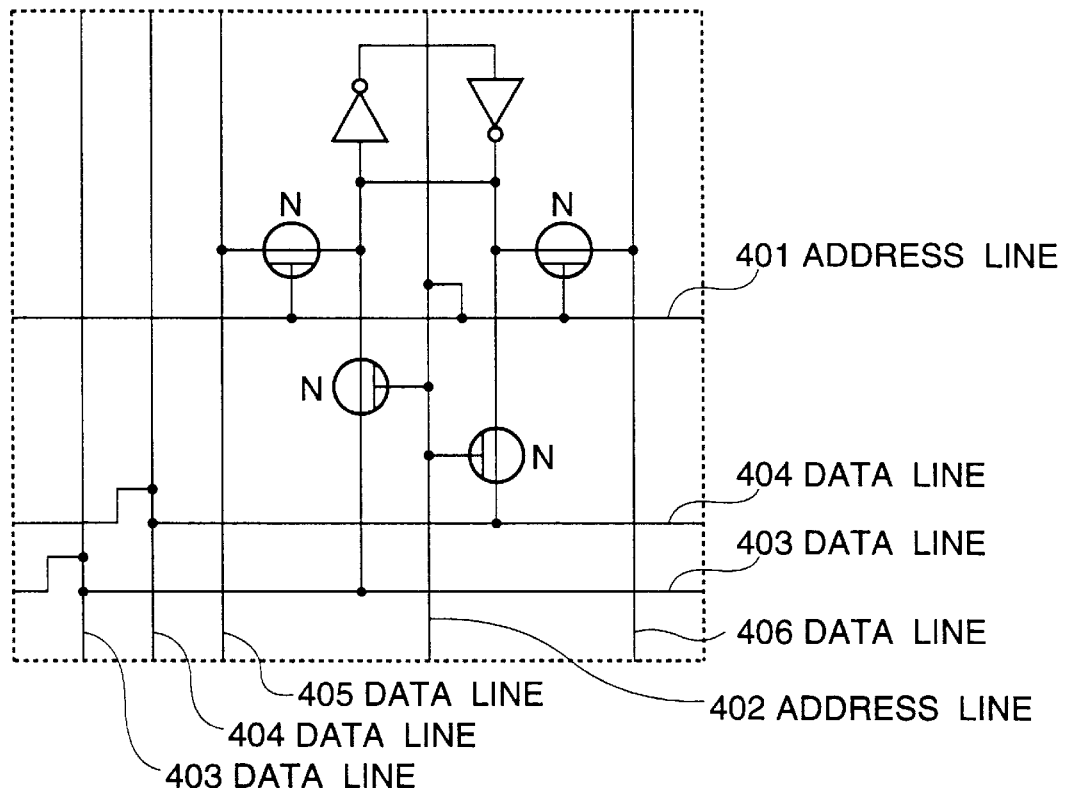
FIG. 2 is a detailed circuit diagram of a RAM cell marked with a circle in FIG. 1.
Figure 3:
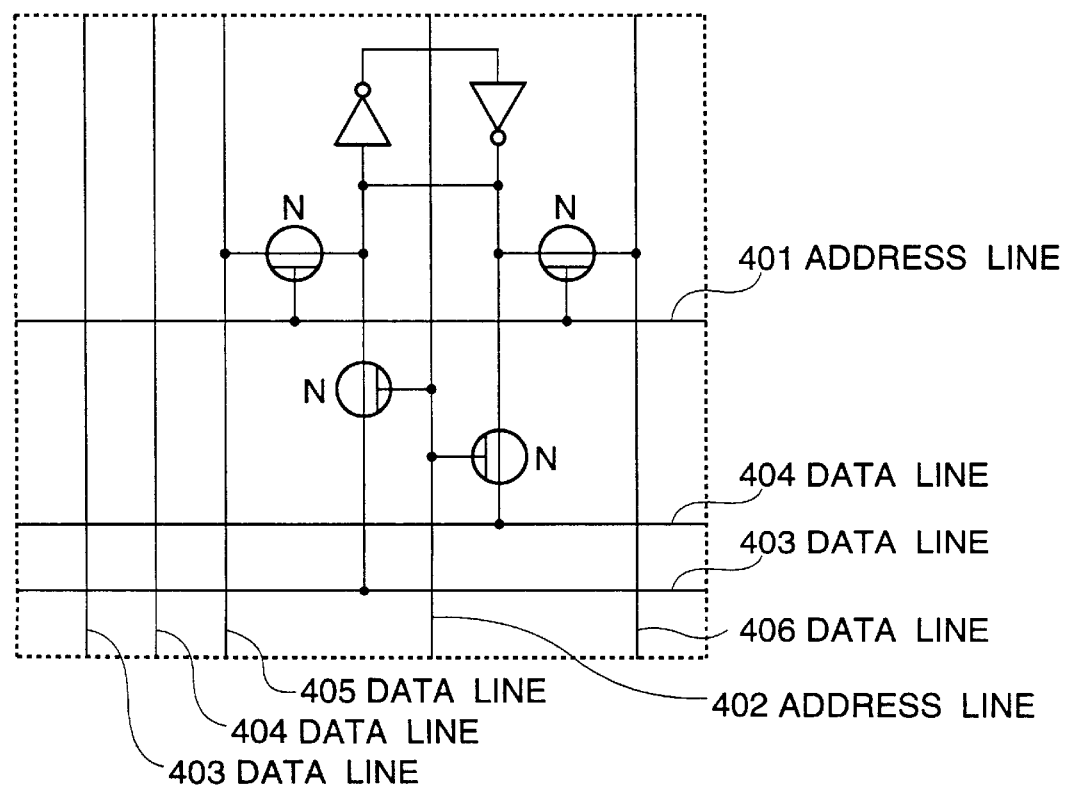
FIG. 3 is a detailed circuit diagram of a RAM cell not marked with a circle in FIG. 1.
Figure 4:
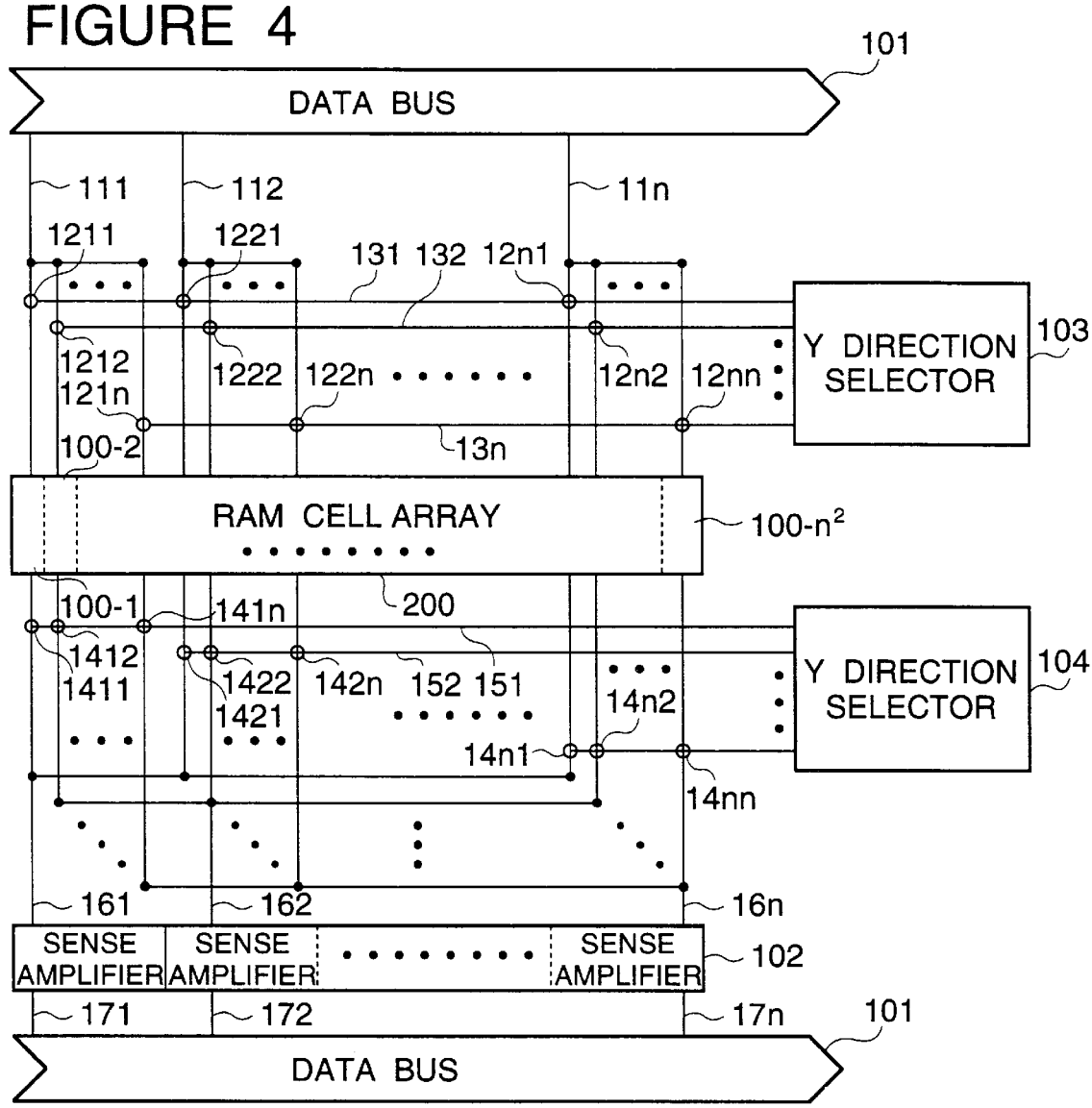
FIG. 4 is a block diagram of a first embodiment of the data transformation device in accordance with the present invention.

Referring to FIG. 4, the first example of a constitution of data transformation device of the present invention is shown. The data transformation device of the present invention is composed of a data bus 101 of "n" bits, "n" data lines 111 to 111n of 1 bit connected to the data bus 101, transfer gates 1211 to 121n, 1221 to 122n, ..., 12n1 to 12nn formed on the "n" branches of each data line 111 to 11n, selecting signal lines 131 to 13n for opening or closing selectively the transfer gates 1211 to 121n, 1221 to 122n, 12n1 to 12nn, a Y direction selector having of "n" selecting signal lines 131 to 13n, a RAM cell array 200 composed of $n^2$ RAM cells 100-1 to 100-$n^2$, transfer gates 1411 to 141n, 1421 to 142n, ..., 14n1 to 14nn formed each on "n" branches of "n" data lines 161 to 16n of 1 bit connected to each RAM of cells 100-1 to 100-$n^2$ of the RAM cell array 200, select signal lines 151 to 15n for opening or closing selectively the transfer gates 1411 to 141n, 1421 to 142n, ..., 14n1 to 14nn, a Y direction selector 104 connected to the selecting signal lines 151 to 15n, a sense amplifier 102 connected to the "n" data lines 161 to 16n of 1 bit, "n" data lines 171 to 17n of 1 bit led from the sense amplifier 102 and connected to the data bus 101.

The "n" branches of data line 111 are connected to the RAM cells 100-1 to 100-n of RAM cell array 200 through the transfer gate 1211 to 121n. Similarly, the "n" branches of each data line 112 to 11n are connected to the RAM cells from 100-n+1 to 2n to 100-$n^2$-n+1 to 100-$n^2$ of RAM cell array 200 through the transfer gates from 1221 to 122n to 12n1 to 12nn.

The select signal line 131 acts for opening or closing at same time the "n" transfer gates 1211 to 12n1 formed on the first branch line of each data line 111 to 11n. Similarly, the selecting signal line 132 to 13n acts for opening or closing at same time "n" transfer gates from 1212 to 12n2 to 121n to 12nn formed on the branch line from the first to the (n)th of each data line 111 to 11n.

N branches of data line 161 are connected to the RAM cells 100-1, 100-n+1, ... 100-$n^2$-n+1 of RAM cell array 200 through the transfer gates 1411 to 14n1. Similarly, "n" branches of each data line 162 to 16n are connected to the RAM cells from 100-2, 100-n+2, ..., 100 $n^2$-n+2 to 100-n, 100-2n, ..., 100-$n^2$ of RAM cell array 200 through the transfer gate from 1412 to 14n2 to 141n to 14nn.

Figure 5:
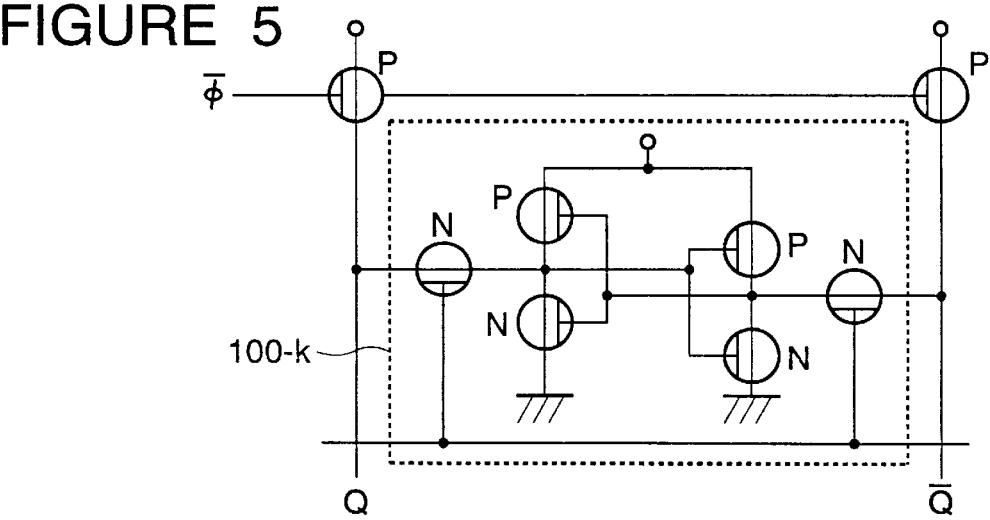
FIG. 5 is a detailed circuit diagram of a RAM cell used in the data transformation device shown in FIG. 4.

The select signal line 151 acts for opening or closing at same time "n" transfer gates 1411 to 14n1 formed on the first branch line of each data line 161 to 16n. Similarly, the selecting signal line 152 to 15n acts for opening or closing at same time the "n" transfer gates from 1421 to 142n to 14n1 to 14nn formed on the branch line from the second to the (n)th of each data line 161 to 16n FIG. 5 shows an example of circuit chart of RAM cells which may be 100-k ($1 \leq k \leq n^2$) used for a general static RAM. The RAM cell 100-k what is called a depression load type formed with 6 transistors, and as it is well known, the detail explanation of its action is neglected. By the way, the RAM cell for using the RAM cell 100-k of this invention is not limited to the RAM cell shown in FIG. 5, of course.

Next, the action of the data transformation device of the first embodiment is explained.

(1) A case of a rotation process of image data that transforms a square image data WDij (i=1 to n (row direction), j=1 to n (column direction) of an n-bit width and an n-bit height to a +90° rotated image data RDlm (l=1 to n (row direction), m=1 to n (column direction).

When a bus master (not shown) transmits the image data WDij (i=1 to n) (j=1 to n) of 1 word (in this embodiment, "n" bits of a row direction is defined as 1 word) to the RAM cell array 200 from the data line 111 to 11n through the data bus 101, the transfer gates 121j to 12nj selected by the selecting signal line 13j from the Y direction selector 103 are opened and all the image data WDij (i=1 to n) are written collectively into the "n" RAM cells 100-k (k=(i−1) n+j ; i=1 to n). By repeating it for j=1 to n, the image data WDij (i=1 to n, j=1 to n) are written into all RAM cells 100-k (k=1 to $n^2$) of the RAM cell array 200 without overlapping.

Next, in a time of reading the image data RDlm (l=1 to n) of 1 word from the RAM cell array 200, the transfer gates 14ml to 14mn selected by the selecting signal lines 15m led from the Y direction selector 104 are opened and the image data RDlm (l=1 to n) are read to the data bus 101 led from the RAM cells 100-k (k=n (m−1)+1; l=1 to n) through the data lines 161 to 16n, the sense amplifier 102 and the data lines 171 to 17n. All the image data RDlm (l=1 to n, m=1 to n) are all read without defects from the RAM cells 100-k (k=1 to n²) of RAM cell array 200 by repeating these actions for m=1 to n.

As the result, the image data RDlm (l=1 to n, m=1 to n) which is processed of a rotation of +90° of the image data Dij (i=1 to n, j=1 to n) are obtained.

(2) A case of a rotation process of image data that transforms a square image data WDij (i=1 to n (row direction), j=1 to n (column direction) of an n-bit width and an n-bit height to a −90° rotated image data RDlm (l=1 to n (row direction), m=1 to n (column direction).

When a bus master (not shown) transmits the image data WDij (i=1 to n) (i=1 to n) of 1 word to the RAM cell array 200 through the data bus 101 and the data line 111 to 11n, the transfer gates 121j to 12nj selected by the selecting signal line 13j led from the Y direction selector 103 are opened and all the image data WDij (i=1 to n) are written collectively to the "n" RAM cells 100-k (k=in−j+1; i=1 to n). By making the selecting signal lines 13n to 131 successively active for j=n to 1 by repeating it, the image data WDij (i=1 to n, j=1 to n) are written into all the RAM cells 100-k (k=1 to n²) of RAM cells array 200 without overlapping.

Next, in a time of reading of the image data RDlm (l=1 to n) of 1 word from the RAM cell array 200, the transfer gates 14ml to 14mn selected by the selecting signal line 15m led from the Y direction selector 104 are opened and the image data RDlm (l=1 to n) are read from the RAM cells 100-k (k=n (m−1)+1; l=1 to n) to the data bus 101 through the data lines 161 to 16n, the sense amplifier 102 and data lines 171 to 17n. All the image data RDlm (l=1 to n, m=1 to n) are read without defect from the RAM cell 100-k (k=1 to n²) of RAM cell array 200 by the above mentioned for m=1 to n.

As the result, the image data RDlm (l=1 to n, m=1 to n) which is processed of rotation of −90° of the image data Dij (i=1 to n, j=1 to n) are obtained.

Figure 6:
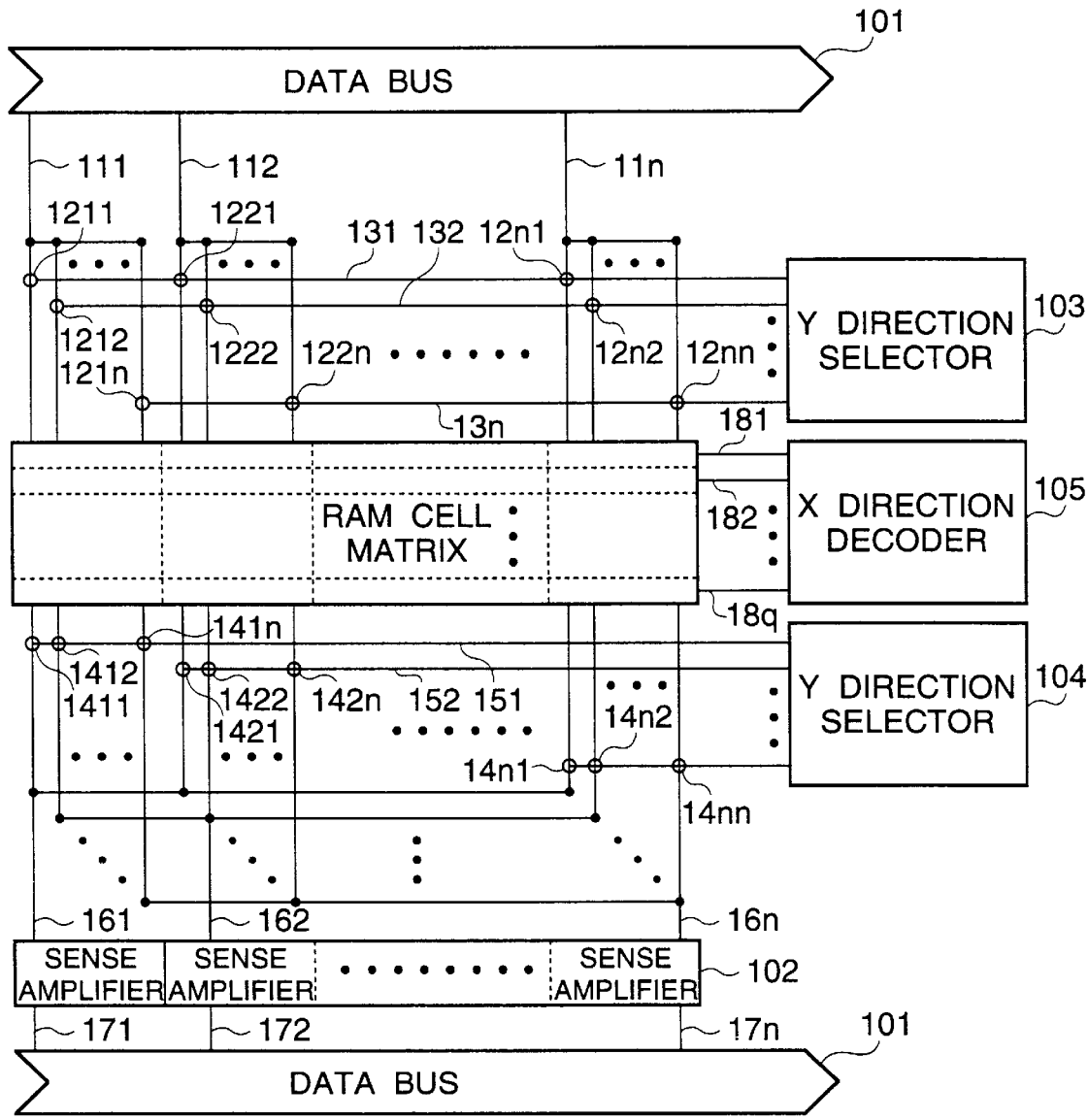
FIG. 6 is a block diagram of a second embodiment of the data transformation device in accordance with the present invention.
Figure 7:
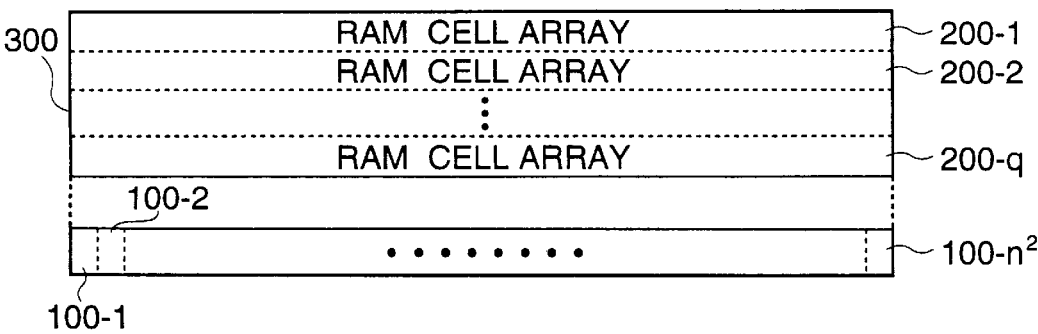
FIG. 7 illustrates a detailed constitution of the RAM cell matrix in FIG. 6.

Referring to FIG. 6, a circuit chart of the second embodiment of data transformation device according to the present invention. The data transformation device of this embodiment is that the RAM cell array 200 of the first embodiment shown in FIG. 4 is replaced with a RAM cell matrix 300, and besides, it is added that a X direction decoder which leads select signal lines 181 to 18q to select one of "q" RAM cell arrays 200-1 to 200-q (q≧2; integer) (referring to FIG. 7) in the RAM cell matrix 300. The RAM cell matrix 300 is a set of "q" RAM cell arrays 200-1 to 200-q, and each RAM cell array 200-1 to 200-q is a set of the RAM cell 100-1 to 100-n² bits. More, The other parts of FIG. 7 are as same as the corresponding parts of FIG. 6, therefore, each corresponding part is referred with same reference number, and its detail experiment is neglected.

Next, an action of data transformation device of the second embodiment is explained.

(3) A case of a rotation process of the image data that transforms "q" items of square image data WDijp (i=1 to n (row direction), j=1 to n (column direction), p=1 to q (number)) of an n-bit width and an n-bit height to the +90° rotated image data RDlmp (l=1 to n (row direction), m=1 to n (column direction), p=1 to q (number)).

At first, the (p)th RAM cell array 200-p in the RAM cell matrix 300 from the X direction decoder 105 by making the selecting signal line 18p active. Under this state, when the bus master (not shown) transfers the image data WDijp (i=1 to n) of 1 word to the RAM cell array 200-p from the data line 111 to I 1n through the data bus 101, the transfer gates 121j to 12nj selected by the select signal line 13j from the Y direction selector 103 are opened and the image data WDij (i=1 to n) are written into the "n" RAM cells 100-k (k=(i−1) n+j ; i=1 to n). By repeating for j=1 to n, the image data WDijp (i=1 to n, j=1 to n) are written into the all RAM cells 100-k (k=1 to n²) of RAM cell array 200-p without overlapping. Moreover, by repeating it for p=1 to q, "q" items of image data WDijp (i=1 to n, j=1 to n) are written without overlapping into all the RAM cells 100-k (k=1 to n²) of RAM cell array 200-p (p=1 to q) in the RAM cell matrix 300.

Next, the (p)th RAM cell array 200-p in the RAM cell matrix 300 are selected by making the selecting signal line 18p led from the X direction decoder 105 active. Under this state, in a time of reading the "q" items of image data RDlmp (l=1 to n) of 1 word from the RAM cell array 200-p, the transfer gates 14ml to 14mn selected by the selecting signal line 15m led from Y direction selector 104 are opened and the image data RDlmp (l=1 to n) are read from RAM cell 100-k (k=n (n−m)+1; (l=1 to n) to the data bus 101 through the data line 161 to 16n, the sense amplifier 102 and the data line 171 to 17n. By repeating it for m=1 to n, all the image data RDlmp (l=1 to n, m=1 to n) are read without defect from all the RAM cells 100-k (k=1 to n²) of all the RAM cell array 200. Moreover, by repeating it for p=1 to q, "q" items of image data WDijp (i=1 to n, j=1 to n, p=1 to q) are read without defect from all the RAM cells 100-k (k=1 to n²) of all the RAM cell array 200-p (p=1 to q) in the RAM cell matrix 300.

As the result, the "q" items of image data RDlmp (l=1 to n, m=1 to n, p=1 to q) which is processed of rotation of −90° of the image data WDijp (i=1 to n, j=1 to n, p=1 to q) are obtained.

(4) A case of a rotation process of the image data that transforms "q" items of square image data WDijp (i=1 to n (row direction), j=1 to n (column direction), p=1 to q (number)) of an n-bit width and an n-bit height to the −90° rotated image data RDlmp (l=1 to n (row direction), m=1 to n (column direction), p=1 to q (number)).

At first, the (p)th RAM cell array 200-p in the RAM cell matrix 300 from the X direction decoder 105 by making the select signal line 18p active. Under this state, when the bus master (not shown) transfers the "q" items of image data WDijp (i=1 to n) of 1 word to the RAM cell array 200-p through the data bus 101 and the data line 111 to 11n, the transfer gates 121j to 12nj selected by the selecting signal line 13j led from the Y direction selector 103 are opened and all the "n" items of image data WDijp (i=1 to n) are written at same time into the "n" RAM cells 100-k (k=(in−j+1) ; i=1 to n). By repeating it for j=1 to n, the "q" items of image data WDijp (i=1 to n, j=1 to n) are written into the all RAM cells 100-k (k=1 to n²) of RAM cell arrays 200-p without overlapping. Moreover, by repeating it for p=1 to q, the "q" items of image data WDijp (i=1 to n, j=1 to n) are written without overlapping into all the RAM cells 100-k (k=1 to n²) of all RAM cell arrays 200-p (p=1 to q) in the RAM cell matrix 300.

Next, the (p)th RAM cell array 200-p in the RAM cell matrix 300 from the X direction decoder 105 by making the select signal line 18p active. Under this state, in a time reading the image data RDlmp (l=1 to n) of 1 word from the RAM cell array 200-p, the transfer gates 141j to 14nj selected by the select signal line 15p led from Y direction selector 104 are opened and the image data RDlmp (l=1 to n) are read from the RAM cell 100-k (k=n (n−m)+1; (l=1 to n) to the data bus 101 through the data line 161 to 16n, the sense amplifier 102 and the data line 171 to 17n. By repeating it for m=1 to n, all the image data RDlmp (l=1 to n, m=1 to n) are read without defects from all the RAM cells 100-k (k=1 to n²) of all the RAM cell array 200. Moreover, by repeating it for p=1 to q, the "q" items of image data WDijp (i=1 to n, j=1 to n, p=1 to q) are read without defect from all the RAM cells 100-k (k=1 to n²) of all the RAM cell array 200-p (p=1 to q) in the RAM cell matrix 300.

As the result, the "q" items of image data RDlmp (l=1 to n, m=1 to n, p=1 to q) which is processed of a rotation of −90° of the image data WDijp (i=1 to n, j=1 to n, p=1 to q) are obtained.

Figure 8:
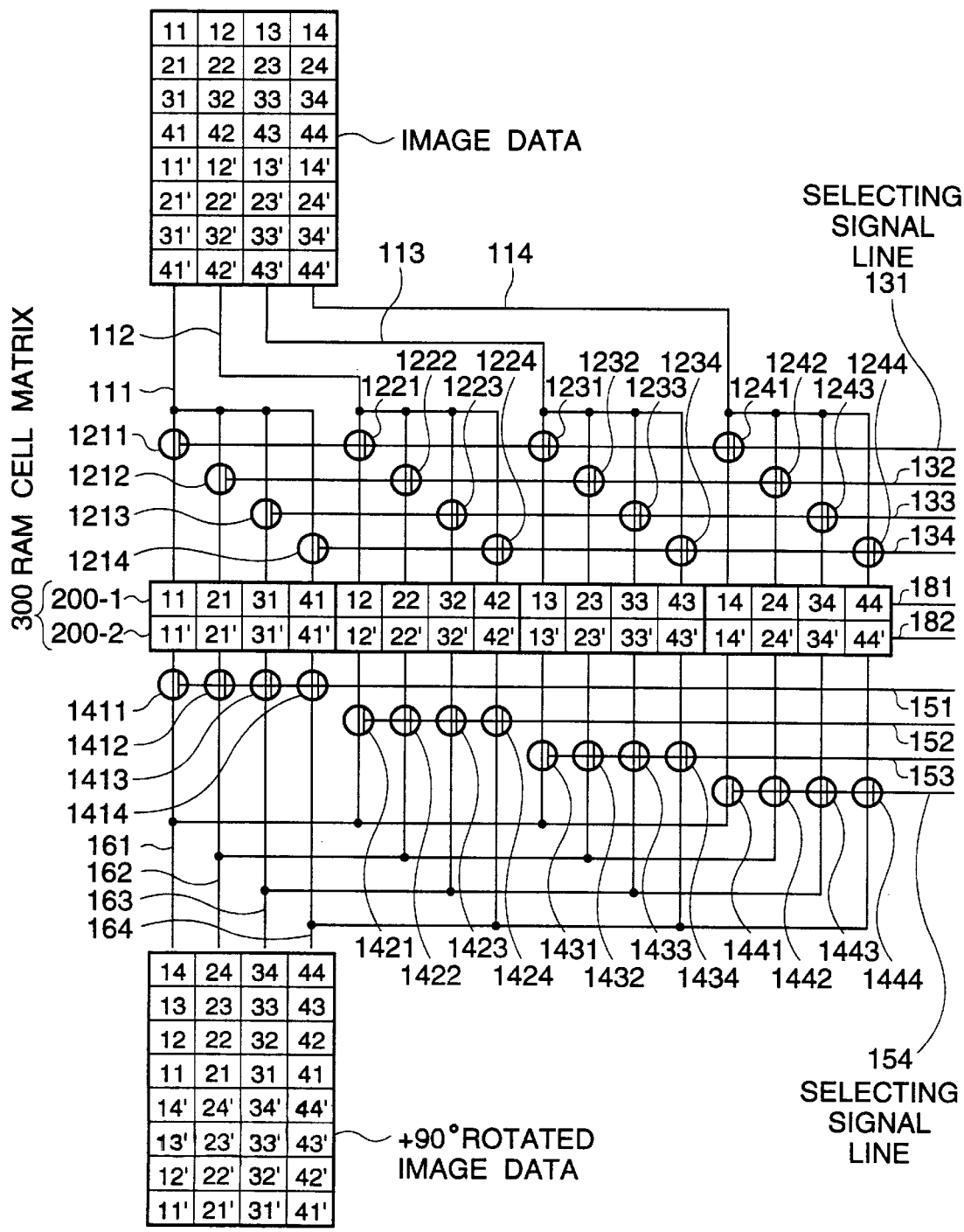
FIG. 8 illustrates an example of the process of +90° rotation of image data by the second embodiment of the data transformation device.
Figure 9:
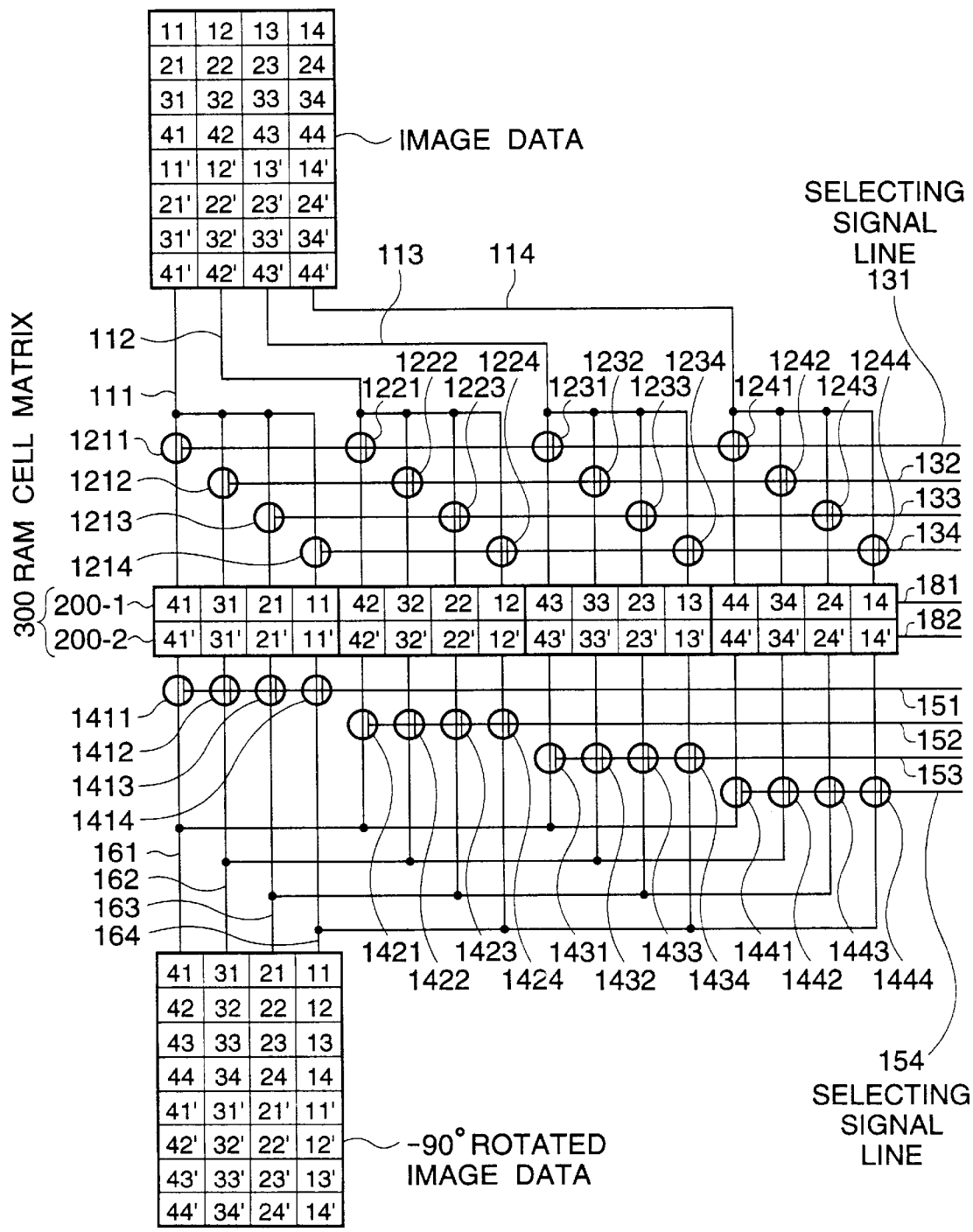
FIG. 9 illustrates an example of the process of −90° rotation of image data by the second embodiment of the data transformation device.

Referring to FIGS. 8 and 9, an action of a rotation of ±90° of two image data of 4 bits×4 bits is explained.

A case of a rotation process of +90° is explained by referring to FIG. 8. The RAM cell array 200-1 in the RAM cell matrix 300 is selected by making the select signal line 181 active. Under this state, when the bus master transfers the image data of 1 word (11, 12, 13, 14) (now, 11, 12, 13, 14 etc. show each position of the image data, same in followings) from the data line 111 to 114 to the RAM cell array 200-1, the transfer gates 1211, 1221, 1231 and 1241 selected by the selecting signal line 131 are opened and each of the image data (11, 12, 13, 14) is written into the RAM cells 100-1, 100-5, 100-9 and 100-13 of RAM cell array 200-1. Similarly, each of the image data (21, 22, 23, 24) is written into the RAM cells 100-2, 100-6, 100-10 and 100-14 of the RAM cell array 200-1 through the transfer gates 1212, 1222, 1232 and 1242 selected by the selecting signal line 132. Similarly, each of the image data (31, 32, 33, 34) is written into each the RAM cells 100-3, 100-7, 100-11 and 100-15 of RAM cell array 200-1 through the transfer gates 1213, 1223, 1233 and 1243 selected by the select signal line 132. Similarly, each of the image data (41, 42, 43, 44) is written into each of the RAM cells 100-4, 100-8, 100-12 and 100-16 of RAM cell array 200-1 through the transfer gates 1214, 1224, 1234 and 1244 selected by the select signal line 132. By these actions, the image data of 4 bits×4 bits are written into all the RAM cell array 200-1 to 100-16 of the RAM cell array 200-1 without overlapping. Next, by making the select signal line 182 active, under the state that the RAM cell array 200-2 is selected in the RAM cell matrix 300, similarly the image data (11', 12', 13', 14'), (21', 22', 23', 24'), (31', 32', 33', 34'), (41', 42', 43', 44') are transferred successively, and all image data of 4 bits×4 bits are written into the RAM cells 100-1 to 100-16 without overlapping. As the result, two image data of 4 bits×4 bits are written into the RAM cell matrix 300 as shown in FIG. 8.

Next, by making the selecting signal line 181 active, the RAM cell array 200-1 of RAM cell matrix 300 is selected. Under this state, the image data of 1 word are read by making the selecting signal line 154 active. The transfer gates 1441 to 1444 selected by the select signal line 154 are opened, and the image data (14, 24, 34, 44) are read from the RAM cell array 100-13, 100-14, 100-15 and 100-16 of RAM cell array 200-1 are read, and they are transferred to the data bus 101. And then, the image data of 1 word from the RAM cell array 200-1 by making the select signal line 153, 152 and 151 successively active. Corresponding to it, the transfer gates 1431 to 1434, 1421 to 1424 and 1411 to 1414 are opened successively and the image data (13, 23, 33, 43), (12, 22, 32, 42) and (11, 21, 31, 41) are read successively from the RAM cells 100-9, 100-10, 100-11, 100-12, RAM cells 100-5, 100-6, 100-7, 100-8 and RAM cells 100-1, 100-2, 100-3, 100-4. They are transferred to the data bus 101. By these actions, the image data of 4 bits×4 bits of the RAM cells 100-1 to 100-16 of RAM cell array 200-1. Further, by making the select signal line 182 active and repeating the similar process for the RAM cell array 200-2 of RAM cell matrix 300, the image data (14', 24', 34', 44'), (13', 23', 33', 43'), (12', 22', 24', 44') and (14', 24', 34', 44') are read in this order from the RAM cells 100-1 to 100-16 of RAM cell array 200-2, and they are transferred to the data bus 101. By these, the image data of 4 bits×4 bits of RAM cells 100-1 to 100-16 of RAM cell array 200-2 are read without defects. As the result, two +90° rotated image data as shown in FIG. 8 are obtained.

A case of a rotation process of −90° is explained by referring to FIG. 9. At first, the RAM cell array 200-1 in RAM cell matrix 300 is selected by making the selecting signal line 181 active. Under this state, when the bus master transfers the image data of 1 word (11, 12, 13, 14) from the data line 111 to 114 to the RAM cell array 200-1, the transfer gates 1214, 1224, 1234 and 1244 selected by the selecting signal line 134 are opened and the image data (11, 12, 13, 14) are written each into the RAM cells 100-4, 100-8 100-12 and 100-16 of the RAM cell array 200-1. Similarly, each of the image data (21, 22, 23, 24) are written each into the RAM cells 100-3, 100-7, 100-11 and 100-15 of the RAM cell array 200-1 through the transfer gates 1213, 1223, 1233 and 1243 selected by the select signal line 132. Similarly, each of the image data (31, 32, 33, 34) is written into each of the RAM cells 100-2, 100-6, 100-10 and 100-14 of RAM cell array 200-1 through the transfer gates 1212, 1222, 1232 and 1243 selected by the selecting signal line 132. Similarly, each of the image data (41, 42, 43, 44) is written into each of the RAM cells 100-2, 100-6, 100-10 and 100-14 of RAM cell array 200-1 through the transfer gates 1211, 1221, 1231 and 1241 selected by the selecting signal line 131. By these actions, the image data of 4 bits×4 bits are written into all the RAM cells 100-1 to 100-16 of RAM cell array 200-1 without overlapping. Next, by making the select signal line 182 active, under the state that the RAM cell array 200-2 is selected in the RAM cell matrix 300, similarly the image data (11', 12', 13', 14'), (21', 22', 23', 24'), (31', 32, 33', 34'), (41', 42', 43', 44') are transferred successively, and all image data of 4 bits×4 bits are written into the RAM cells 100-1 to 100-16 without overlapping. As the result, two image data of 4 bits×4 bits are written into the RAM cell matrix 300 as shown in FIG. 9.

Next, by making the selecting signal line 181 active, the RAM cell array 200-1 of RAM cell matrix 300 is selected. Under this state, the image data of 1 word are read by making the selecting signal line 154 active. The transfer gates 1411 to 1414 selected by the selecting signal line 151 are opened, and the image data (41, 31, 21, 11) are read from the RAM cell array 100-1, 100-2, 100-3 and 100-4 of RAM cell array 200-1 are read, and they are transferred to the data bus 101. And then, the image data of 1 word from the RAM cell array 200-1 by making the selecting signal line 152, 153 and 154 successively active. Corresponding to it, the transfer gates 1421 to 1424, 1443 to 1434 and 1441 to 1444 are opened successively and the image data (42, 32, 22, 12), (43, 33, 23, 13) and (44, 34, 24, 14) are read successively from the RAM cells 100-5, 100-6, 100-7, 100-8, RAM cells 100-9, 100-10, 100-11, 100-12 and RAM cells 100-13, 100-14, 100-15, 100-16. They are transferred to the data bus 101. By these actions, the image data of 4 bits×4 bits of the RAM cells 100-1 to 100-16 of RAM cell array 200-1. Further, by making the select signal line 182 active and repeating the similar process for the RAM cell array 200-2 of RAM cell matrix 300, the image data (41', 31'. 21'. 11'), (42', 32', 22', 12'), (43', 33', 23', 13') and (44', 34', 24', 14') are read in this order from the RAM cells 100-1 to 100-16 of RAM cell array 200-2, and they are transferred to the data bus 101. By these, the image data of 4 bits×4 bits of the RAM cells 100-1 to 100-16 of RAM cell array 200-2 are read without defect. As the result, two −90° rotated image data as shown in FIG. 9 are obtained.

The data transformation device of the present invention is applied effectively to a print buffer of printer device. Especially, the present invention is used effectively in a case to transfer the ±90° rotated image data directly to the print head.

As mentioned above, the data transformation device of the present invention comprises a RAM cell array composed of RAM cells of $n^2$, and data writing means to write the image data of "n" bits at same time into a selected RAM cell of the RAM cell array, and data reading means to read collectively image data of "n" bits from a selected RAM cell of the RAM cell array. And by these constitutions, it realizes a rotation process of ±90° of the image data of "n" bits×"n" bits by using a general RAM cell which has not two systems of address lines and data lines. As the result, it produces the effects that its circuits scale becomes small and its area is reduced. Regarding to its area, in a case of a 6-transistor cell, it is reduced about 30% to 40% in comparison with the RAM cell of constitution about 8 transistors. And also it produces an effect to make the wire length short and reduce the delay time.

And also, it comprises a RAM cell matrix of a set of plural RAM cell arrays composed of RAM cells of $n^2$ and a RAM cell selecting means to select a RAM cell array of the RAM matrix, data writing means to write the image data of "n" bits collectively into a selected RAM cell of the RAM cell array, and data reading means to read image data of "n" bits collectively from a selected RAM cell of the RAM cell array. And by these constitutions, it realizes a rotation process of ±90° of the image data of "n" bits×"n" bits by using a general RAM cell which has not two systems of address lines and data lines. As the result, it produces the effects that its circuits scale becomes small and its area is reduced. Regarding to its area, in a case of a 6-transistor cell, it is reduced of 30% to 40% in comparison with the RAM cell of a 8-transistor cell. And also it produces an effect to shorten the wire length and reduce the delay time.

The invention has thus been shown and described with reference to the specific embodiments. However, it should be noted that the present invention is in no way limited to the details of the illustrated structures but changes and modifications may be made within the scope of the appended claims.

I claim:

1. A data transformation device for transforming a square image data WDij (i=1 to n (row direction), j=1 to n (column direction)) of an n-bit width and an n-bit height to only a 90° rotated image data RDlm (l=1 to n (row direction), m=1 to n (column direction)) comprising:

a RAM cell array composed of RAM cells of $n^2$, data writing means including an input data bus of "n" bits, "n" input data lines IBLj (j=1 to n) connected to said "n" bits of said input data bus, respectively, each of said "n" input data lines IBLj having "n" input branches IBij (i=1 to n), so that "$n^2$" input branches IBij (i=1 to n, j=1 to n) are provided, said "$n^2$" input branches IBij being connected to said RAM cells of $n^2$, respectively, in a one-to-one relation, "$n^2$" input transfer gates ITGij formed in the way of said "$n^2$" input branches IBij, respectively, "n" input selecting signal lines ISLi each connected to each "n" input transfer gates ITGij (j=1 to n) to selectively and collectively open said "n" input transfer gates ITGij (j=1 to n) in units of "n" input transfer gates, and an input selector connected to said "n" input selecting signal lines ISLi to alternatively activate said "n" input selecting signal lines ISLi, so that said data writing means collectively writes an n-bit image WDij (i=1 to n) into "n" RAM cells at an address {(i=1)n+j}(i=1 to n) in said RAM cell array, and data reading means including an output data bus of "n" bits, "n" output data lines OBLi (i=1 to n) connected to said "n" bits of said output data bus, respectively, each of said "n" output data lines OBLi having "n" output branches OBij (j=1 to n), so that "$n^2$" output branches OBij (i=1 to n, j=1 to n) are provided, said "$n^2$" output branches OBij being connected to said RAM cells of $n^2$, respectively, in a one-to-one relation, "$n^2$" output transfer gates OTGij formed in the way of said "$n^2$" output branches OBij, respectively, "n" output selecting signal lines OSLi each connected to each "n" output transfer gates OTGij (i=1 to n) to selectively and collectively open said "n" output transfer gates OTGij (i=1 to n) in units of "n" output transfer gates, and an output direction selector connected to said "n" output selecting signal lines OSLi to alternatively activate said "n" output selecting signal lines OSLi, so that said data reading means collectively reads an n-bit image data RDlm (l=1 to n) from RAM cells at an address {n(n−m)+1}(l=1 to n) in said RAM cell array.

2. A data transformation device claimed in claim 1, wherein said RAM cell is composed of 6 transistors.

3. A data transformation device for transforming a square image data WDij (i=1 to n (row direction), j=1 to n (column direction)) of an n-bit width and an n-bit height to only a −90° rotated image data RDlm (l=1 to n (row direction), m=1 to n (column direction)) comprising:

a RAM cell array composed of RAM cells of $n^2$, data writing means including an input data bus of "n" bits,"n" input data lines IBLj (j=1 to n) connected to said "n" bits of said input data bus, respectively, each of said "n" input data lines IBLj having "n" input branches IBij (i=1 to n), so that "$n^2$" input branches IBij (i=1 to n, j=1 to n) are provided, said "$n^2$" input branches IBij being connected to said RAM cells of $n^2$, respectively, in a one-to-one relation, "$n^2$" input transfer gates ITGij formed in the way of said "$n^2$" input branches IBij, respectively, "n" input selecting signal lines ISLi each connected to each "n" input transfer gates ITGij (j=1 to n) to selectively and collectively open said "n" input transfer gates ITGij (j=1 to n) in units of "n" input transfer gates, and an input selector connected to said "n" input selecting signal lines ISLi to alternatively activate said "n" input selecting signal lines ISLi, so that said data writing means collectively writes an n-bit image data WDij (i=1 to n) into "n" RAM cells at an address {in−j+1}(i=1 to n) in said RAM cell array, and data reading means including an output data bus of "n" bits, "n" output data lines OBLi (i=1 to n) connected to said "n" bits of said output data bus, respectively, each of said "n" output data lines OBLi having "n" output branches OBij (j=1 to n), so that "$n^2$" output branches OBij (i=1 to n, j=1 to n) are provided, said "$n^2$" output branches OBij being connected to said RAM cells of $n^2$, respectively, in a one-to-one relation, "$n^2$" output transfer gates OTGij formed in the way of said "$n^2$" output branches OBij, respectively, "n" output selecting signal lines OSLi each connected to each "n" output transfer gates OTGij (i=1 to n) to selectively and collectively open said "n" output transfer gates OTGij (i=1 to n) in units of "n" output transfer gates, and an output direction selector connected to said "n" output selecting signal lines OSLi to alternatively activate said "n" output selecting signal lines OSLi, so that said data reading means collectively reads an n-bit image data RDlm (l=1 to n) from RAM cells at an address {n(m−1)+1}(l=1 to n) of the RAM cell array.

4. A data transformation device claimed in claim 3, wherein said RAM cell is composed of 6 transistors.

5. A data transformation device for transforming "q" items of (q≧2, integer) square image data WDijp (i=1 to n (row direction), j=1 to n (column direction), p=1 to q (number)) of an n-bit width and an n-bit height to "q" items of only +90° rotated image data RDlm (l=1 to n (row direction), m=1 to n, (column direction), p=1 to q (number)), comprising:

a RAM cell matrix constituted of a set of "q" RAM cell arrays composed of RAM cells of $n^2$, RAM cell selecting means to select a (p)th RAM cell array from said RAM cell matrix, data writing means including an input data bus of "n" bits,"n" input data lines IBLj (j=1 to n) connected to said "n" bits of said input data bus, respectively, each of said "n" input data lines IBLj having "n" input branches IBij (i=1 to n), so that "$n^2$" input branches IBij (i=1 to n, j=1 to n) are provided, said "$n^2$" input branches IBij being connected to said RAM cells of $n^2$, respectively, in a one-to-one relation, "$n^2$" input transfer gates ITGij formed in the way of said "$n^2$" input branches IBij, respectively, "n" input selecting signal lines ISLi each connected to each "n" input transfer gates ITGij (j=1 to n) to selectively and collectively open said "n" input transfer gates ITGij (j=1 to n) in units of "n" input transfer gates, and an input selector connected to said "n" input selecting signal lines ISLi to alternatively activate said "n" input selecting signal lines ISLi, so that said data writing means collectively writes an n-bit image data WDij (i=1 to n) into "n" RAM cells at an address {(i−1)n+j}(i=1 to n) of said (p)th RAM cell array selected by said RAM cell array selecting means, and data reading means including an output data bus of "n" bits, "n" output data lines OBLi (i=1 to n) connected to said "n" bits of said output data bus, respectively, each of said "n" output data lines OBLi having "n" output branches OBij (j=1 to n), so that "$n^2$" output branches OBij (i=1 to n, j=1 to n) are provided, said "$n^2$" output branches OBij being connected to said RAM cells of $n^2$, respectively, in a one-to-one relation, "$n^2$" output transfer gates OTGij formed in the way of said "$n^2$" output branches OBij, respectively, "n" output selecting signal lines OSLi each connected to each "n" output transfer gates OTGij (i=1 to n) to selectively and collectively open said "n" output transfer gates OTGij (i=1 to n) in units of "n" output transfer gates, and an output direction selector connected to said "n" output selecting signal lines OSLi to alternatively activate said "n" output selecting signal lines OSLi, so that said data reading means collectively reads an n-bit image data RDlm (l=1 to n) from RAM cells at an address {n(n−m)+1}(l=1 to n) of said (p)th RAM cell array selected by said RAM cell array selecting means.

6. A data transformation device claimed in claim 5, wherein said RAM cell array selecting means is composed of selecting signal lines for selecting a RAM cell array of the RAM cell matrix, and an X direction decoder connected to said selecting signal lines.

7. A data transformation device claimed in claim 5, wherein said RAM cell is composed of 6 transistors.

8. A data transformation device for transforming "q" items of (q≧2, integer) square image data WDijp (i=1 to n (row direction), j=1 to n (column direction), p=1 to q (number)) of an n-bit width and an n-bit height to "q" items of only −90° rotated image data RDlmp (l=1 to n (row direction), m=1 to n (column direction), p=1 to q (number)), comprising:

a RAM cell matrix constituted of a set of "q" RAM cell arrays composed of RAM cells of $n^2$, RAM cell selecting means to select a (p)th RAM cell array from said RAM cell matrix, data writing means including an input data bus of "n" bits,"n" input data lines IBLj (j=1 to n) connected to said "n" bits of said input data bus, respectively, each of said "n" input data lines IBLj having "n" input branches IBij (i=1 to n), so that "$n^2$" input branches IBij (i=1 to n, j=1 to n) are provided, said "$n^2$" input branches IBij being connected to said RAM cells of $n^2$, respectively, in a one-to-one relation, "$n^2$" input transfer gates ITGij formed in the way of said "$n^2$" input branches IBij, respectively, "n" input selecting signal lines ISLi each connected to each "n" input transfer gates ITGij (j=1 to n) to selectively and collectively open said "n" input transfer gates ITGij (j=1 to n) in units of "n" input transfer gates, and an input selector connected to said "n" input selecting signal lines ISLi to alternatively activate said "n" input selecting signal lines ISLi, so that said data writing means collectively writes an n-bit image data WDij (i=1 to n) into "n" RAM cells at an address {in−j+1}(i=1 to n) of said (p)th RAM cell array selected by said RAM cell array selecting means, and data reading means including an output data bus of "n" bits, "n" output data lines OBLi (i=1 to n) connected to said "n" bits of said output data bus, respectively, each of said "n" output data lines OBLi having "n" output branches OBij (j=1 to n), so that "$n^2$" output branches OBij (i=1 to n, j=1 to n) are provided, said "$n^2$" output branches OBij being connected to said RAM cells of $n^2$, respectively, in a one-to-one relation, "$n^2$" output transfer gates OTGij formed in the way of said "$n^2$" output branches OBij, respectively, "n" output selecting signal lines OSLi each connected to each "n" output transfer gates OTGij (i=1 to n) to selectively and collectively open said "n" output transfer gates OTGij (i=1 to n) in units of "n" output transfer gates, and an output direction selector connected to said "n" output selecting signal lines OSLi to alternatively activate said "n" output selecting signal lines OSLi, so that said data reading means collectively reads an n-bit image data RDlm (l=1 to n) from RAM cells at an address {n(n−m)+1}(l=1 to n) of said (p)th RAM cell array selected by said RAM cell array selecting means.

9. A data transformation device claimed in claim 8, wherein said RAM cell array selecting means is composed of selecting signal lines for selecting a RAM cell array of the RAM cell matrix, and an X direction decoder connected to said selecting signal lines.

10. A data transformation device claimed in claim 8, wherein said RAM cell is composed of 6 transistors.

11. A data transformation device for transforming a square image data WDij (i=1 to n (row direction), j=1 to n (column direction)) of an n-bit width and an n-bit height to only a +90° rotated image data RDlm (l=1 to n (row direction), m=1 to n (column direction)) comprising:

a RAM cell array composed of RAM cells of $n^2$, a data writer including an input data bus of "n" bits, "n" input data lines IBLj (j=1 to n) connected to said "n" bits of said input data bus, respectively, each of said "n" input data lines IBLj having "n" input branches IBij (i=1 to n), so that "$n^2$" input branches IBij (i=1 to n, j=1 to n) are provided, said "$n^2$" input branches IBij being connected to said RAM cells of $n^2$, respectively, in a one-to-one relation, "$n^2$" input transfer gates ITGij formed in the way of said "$n^2$" input branches IBij, respectively, "n" input selecting signal lines ISLi each connected to each "n" input transfer gates ITGij (j=1 to n) to selectively and collectively open said "n" input transfer gates ITGij (j=1 to n) in units of "n" input transfer gates, and an input selector connected to said "n" input selecting signal lines ISLi to alternatively activate said "n" input selecting signal lines ISLi, so that said data writer collectively writes an n-bit image data WDij (i=1 to n) into "n" RAM cells at an address {(i−1)n+j}(i=1 to n) in said RAM cell array, and a data reader including an output data bus of "n" bits, "n" output data lines OBLi (i=1 to n) connected to said "n" bits of said output data bus, respectively, each of said "n" output data lines OBLi having "n" output branches OBij (j=1 to n), so that "$n^2$" output branches OBij (i=1 to n, j=1 to n) are provided, said "$n^2$" output branches OBij being connected to said RAM cells of $n^2$, respectively, in a one-to-one relation, "$n^2$" output transfer gates OTGij formed in the way of said "$n^2$" output branches OBij, respectively, "n" output selecting signal lines OSLi each connected to each "n" output transfer gates OTGij (i=1 to n) to selectively and collectively open said "n" output transfer gates OTGij (i=1 to n) in units of "n" output transfer gates, and an output direction selector connected to said "n" output selecting signal lines OSLi to alternatively activate said "n" output selecting signal lines OSLi, so that said data reader collectively reads an n-bit image data RDlm (l=1 to n) from RAM cells at an address {n(n−m)+1}(l=1 to n) in said RAM cell array.

12. A data transformation device claimed in claim 11, wherein said RAM cell is composed of 6 transistors.

13. A data transformation device for transforming a square image data WDij (i=1 to n (row direction), j=1 to n (column direction)) of an n-bit width and an n-bit height to only a −90° rotated image data RDlm (l=1 to n (row direction), m=1 to n (column direction)) comprising:

a RAM cell array composed of RAM cells of $n^2$, a data writer including an input data bus of "n" bits, "n" input data lines IBLj (j=1 to n) connected to said "n" bits of said input data bus, respectively, each of said "n" input data lines IBLj having "n" input branches IBij (i=1 to n), so that "$n^2$" input branches IBij (i=1 to n, j=1 to n) are provided, said "$n^2$" input branches IBij being connected to said RAM cells of $n^2$, respectively, in a one-to-one relation, "$n^2$" input transfer gates ITGij formed in the way of said "$n^2$" input branches IBij, respectively, "n" input selecting signal lines ISLi each connected to each "n" input transfer gates ITGij (j=1 to n) to selectively and collectively open said "n" input transfer gates ITGij (j=1 to n) in units of "n" input transfer gates, and an input selector connected to said "n" input selecting signal lines ISLi to alternatively activate said "n" input selecting signal lines ISLi, so that said data writer collectively writes an n-bit image data WDij (i=1 to n) into "n" RAM cells at an address {in−j+1}(i=1 to n) of said RAM cell array, a data reader including an output data bus of "n" bits, "n" output data lines OBLi (i=1 to n) connected to said "n" bits of said output data bus, respectively, each of said "n" output data lines OBLi having "n" output branches OBij (j=1 to n), so that "$n^2$" output branches OBij (i=1 to n, j=1 to n) are provided, said "$n^2$" output branches OBij being connected to said RAM cells of $n^2$, respectively, in a one-to-one relation, "$n^2$" output transfer gates OTGij formed in the way of said "$n^2$" output branches OBij, respectively, "n" output selecting signal lines OSLi each connected to each "n" output transfer gates OTGij (i=1 to n) to selectively and collectively open said "n" output transfer gates OTGij (i=1 to n) in units of "n" output transfer gates, and an output direction selector connected to said "n" output selecting signal lines OSLi to alternatively activate said "n" output selecting signal lines OSLi, so that said data reader collectively reads an n-bit image data RDlm (l=1 to n) from RAM cells at an address {n(m−1)+1}(l=1 to n) of the RAM cell array.

14. A data transformation device claimed in claim 13, wherein said RAM cell is composed of 6 transistors.

15. A data transformation device for transforming "q" items of (q≧2, integer) square image data WDijp (i=1 to n (row direction), j=1 to n (column direction), p=1 to q (number) of an n-bit width and an n-bit height to "q" items of only +90° rotated image data RDlmp (l=1 to n (row direction), m=1 to n (column direction), p=1 to q (number)), comprising:

a RAM cell matrix constituted of a set of "q" RAM cell arrays composed of RAM cells of $n^2$, a RAM cell selector selecting a (p)th RAM cell array from said RAM cell matrix, a data writer including an input data bus of "n" bits, "n" input data lines IBLj (j=1 to n) connected to said "n" bits of said input data bus, respectively, each of said "n" input data lines IBLj having "n" input branches IBij (i=1 to n), so that "$n^2$" input branches IBij (i=1 to n, j=1 to n) are provided, said "$n^2$" input branches IBij being connected to said RAM cells of $n^2$, respectively, in a one-to-one relation, "$n^2$" input transfer gates ITGij formed in the way of said "$n^2$" input branches IBij, respectively, "n" input selecting signal lines ISLi each connected to each "n" input transfer gates ITGij (j=1 to n) to selectively and collectively open said "n" input transfer gates ITGij (j=1 to n) in units of "n" input transfer gates, and an input selector connected to said "n" input selecting signal lines ISLi to alternatively activate said "n" input selecting signal lines ISLi, so that said data writer collectively writes an n-bit image data WDij (i=1 to n) into "n" RAM cells at an address {i−1)n+j }(i=1 to n) of said (p)th RAM cell array selected by said RAM cell array selector, and a data reader including an output data bus of "n" bits, "n" output data lines OBLi (i=1 to n) connected to said "n" bits of said output data bus, respectively, each of said "n" output data lines OBLi having "n" output branches OBij (j=1 to n), so that "$n^2$" output branches OBij (i=1 to n, j=1 to n) are provided, said "$n^2$" output branches OBij being connected to said RAM cells of $n^2$, respectively, in a one-to-one relation, "$n^2$" output transfer gates OTGij formed in the way of said "$n^2$" output branches OBij, respectively, "n" output selecting signal lines OSLi each connected to each "n" output transfer gates OTGij (i=1 to n) to selectively and collectively open said "n" output transfer gates OTGij (i=1 to n) in units of "n" output transfer gates, and an output direction selector connected to said "n" output selecting signal lines OSLi to alternatively activate said "n"

output selecting signal lines OSLi, so that said data reader collectively reads an n-bit image data RDlm (l=1 to n) from RAM cells at an address {n(n−m)+1}(l=1 to n) of said (p)th RAM cell array selected by said RAM cell array selector.

16. A data transformation device claimed in claim 15, wherein said RAM cell array selector is composed of selecting signal lines for selecting a RAM cell array of the RAM cell matrix, and an X direction decoder connected to said selecting signal lines.

17. A data transformation device claimed in claim 15, wherein said RAM cell is composed of 6 transistors.

18. A data transformation device for transforming "q" items of (q≧2, integer) square image data WDijp (i=1 to n (row direction), j=1 to n (column direction), p=1 to q (number)) of an n-bit width and an n-bit height to "q" items of only −90° rotated image data RDlmp (l=1 to n (row direction), m=1 to n (column direction), p=1 to q (number)), comprising:

a RAM cell matrix constituted of a set or "q" RAM cell arrays composed of RAM cells of $n^2$, a RAM cell selector selecting a (p)th RAM cell array from said RAM cell matrix, a data writer including an input data bus of "n" bits, "n" input data lines IBLj (j=1 to n) connected to said "n" bits of said input data bus, respectively, each of said "n" input data lines IBLj having "n" input branches IBij (i=1 to n), so that "$n^2$" input branches IBij (i=1 to n, j=1 to n) are provided, said "$n^2$" input branches IBij being connected to said RAM cells of $n^2$, respectively, in a one-to-one relation, "$n^2$" input transfer gates ITGij formed in the way of said "$n^2$" input branches IBij, respectively, "n" input selecting signal lines ISLi each connected to each "n" input transfer gates ITGij (j=1 to n) to selectively and collectively open said "n" input transfer gates ITGij (j=1 to n) in units of "n" input transfer gates, and an input selector connected to said "n" input selecting signal lines ISLi to alternatively activate said "n" input selecting signal lines ISLi, so that said data writer collectively writes an n-bit image data WDij (i=1 to n) into "n" RAM cells at an address {in−j+1}(i=1 to n) of said (p)th RAM cell array selected by said RAM cell array selector, and a data reader including an output data bus of "n" bits, "n" output data lines OBLi (i=1 to n) connected to said "n" bits of said output data bus, respectively, each of said "n" output data lines OBLi having "n" output branches OBij (j=1 to n), so that "$n^2$" output branches OBij (i=1 to n, j=1 to n) are provided, said "$n^2$" output branches OBij being connected to said RAM cells of $n^2$, respectively, in a one-to-one relation, "$n^2$" output transfer gates OTGij formed in the way of said "$n^2$" output branches OBij, respectively, "n" output selecting signal lines OSLi each connected to each "n" output transfer gates OTGij (i=1 to n) to selectively and collectively open said "n" output transfer gates OTGij (i=1 to n) in units of "n" output transfer gates, and an output direction selector connected to said "n" output selecting signal lines OSLi to alternatively activate said "n" output selecting signal lines OSLi, so that said data reader collectively reads an n-bit image data RDlm (l=1 to n) from RAM cells at an address {n(m−1)+1}(l=1 to n) of said (p)th RAM cell array selected by said RAM cell array selector.

19. A data transformation device claimed in claim 18, wherein said RAM cell array selector is composed of selecting signal lines for selecting a RAM cell array of the RAM cell matrix, and an X direction decoder connected to said selecting signal lines.

20. A data transformation device claimed in claim 18, wherein said RAM cell is composed of 6 transistors.

* * * * *